(12) United States Patent
Zhang et al.

(10) Patent No.: US 10,048,109 B2
(45) Date of Patent: Aug. 14, 2018

(54) DIGITAL LOAD CELL AND CELL NETWORK

(71) Applicants: Mettler Toledo (Changzhou) Precision Instrument Ltd., Changzhou, Jiangsu (CN); Mettler Toledo (Changzhou) Measurement Technology Ltd., Changzhou, Jiangsu (CN); Mettler Toledo (Changzhou) Scale & System Ltd., Changzhou, Jiangsu (CN)

(72) Inventors: Ying Zhang, Changzhou (CN); Shaowen Zheng, Changzhou (CN); Jianwei Wu, Changzhou (CN)

(73) Assignees: METTLER TOLEDO (CHANGZHOU) PRECISION INSTRUMENT LTD., Changzhou, Jiangsu (CN); METTLER TOLEDO (CHANGZHOU) MEASUREMENT TECHNOLOGY LTD., Changzhou, Jiangsu (CN); METTLER TOLEDO (CHANGZHOU) SCALE & SYSTEM LTD., Changzhou, Jiangsu (CN)

( * ) Notice: Subject to any disclaimer, the term of this patent is extended or adjusted under 35 U.S.C. 154(b) by 0 days.

(21) Appl. No.: 15/479,360

(22) Filed: Apr. 5, 2017

(65) Prior Publication Data

US 2017/0205271 A1 Jul. 20, 2017

Related U.S. Application Data

(63) Continuation of application No. PCT/CN2015/091555, filed on Oct. 9, 2015.

(30) Foreign Application Priority Data

Oct. 9, 2014 (CN) .......................... 2014 1 0529712

(51) Int. Cl.
*G01G 3/14* (2006.01)
*H04W 84/18* (2009.01)
*G01B 7/16* (2006.01)

(52) U.S. Cl.
CPC .............. *G01G 3/14* (2013.01); *H04W 84/18* (2013.01); *G01B 7/18* (2013.01)

(58) Field of Classification Search
CPC .......... G01G 3/14; G01G 19/22; G01G 19/18; G01B 7/20; G01B 7/18; G01L 1/225
(Continued)

(56) References Cited

U.S. PATENT DOCUMENTS 5,254,992 A * 10/1993 Keen .................... G01D 3/0365
177/210 R
5,442,146 A 8/1995 Bell et al.
(Continued)

FOREIGN PATENT DOCUMENTS

CN 201166791 Y 12/2008
CN 102608945 A 7/2012
(Continued)

*Primary Examiner* — Shahed Ahmed
(74) *Attorney, Agent, or Firm* — Standley Law Group LLP

(57) ABSTRACT

A digital load cell has a force measurement element, a power incentive module, a signal detection module, a microprocessor, a communication module, a current control module and a configuration control module. First configuration control information configures the signal detection module to use a corresponding detection mode to perform signal conversion. Second configuration control information configures the processor to use one or more corresponding kernels or processors for running. Third configuration control information configures the communication module to use a corresponding communication protocol, terminal matching and impedance control for communication. Fourth configuration control information configures the current
(Continued)

control module to use the on/off, voltage values and current values of the power incentive module, the signal detection module, the microprocessor and the communication module. The configuration control module sends the first to fourth configuration control information according to a working mode selected by a user.

14 Claims, 6 Drawing Sheets

(58) Field of Classification Search
USPC .................. 702/23, 32, 42, 47, 98, 129, 147
See application file for complete search history.

(56) References Cited

U.S. PATENT DOCUMENTS

| | | | |
|---|---|---|---|
| 6,112,162 A | 8/2000 | Richards | |
| 2007/0282506 A1* | 12/2007 | Breed | B60N 2/028 |
| | | | 701/45 |
| 2010/0071464 A1* | 3/2010 | Montanari | G01M 1/02 |
| | | | 73/462 |
| 2015/0177054 A1* | 6/2015 | Bliss | G01G 19/022 |
| | | | 73/1.13 |

FOREIGN PATENT DOCUMENTS

| | | |
|---|---|---|
| CN | 202309211 U | 7/2012 |
| CN | 103713611 A | 4/2014 |

* cited by examiner

DIGITAL LOAD CELL AND CELL NETWORK

CROSS-REFERENCE TO RELATED APPLICATIONS

This application is a bypass continuation of PCT application PCT/CN2015/091555, filed 9 Oct. 2015, which, in turn, claims priority to Chinese patent application 201410529712.2, filed on 9 Oct. 2014. The content of each of these applications is incorporated by reference as if fully recited herein.

TECHNICAL FIELD

The disclosed embodiments relate to a weighing system, and in particular to a digital load cell and a cell network.

BACKGROUND

In modern industrial production procedures, weight information provided by a weighing system is a key information source and control target. With the development of digitalization and information technology, the traditional weighing systems start to step into a digital weighing system era. Specifically, a circuit with a high-precision analog-to-digital conversion function and digital processing capability is built in a sensor to convert load stress information about the sensor into a digital signal. One or more digital load cells interact data and instructions with terminal devices such as a measuring instrument and an industrial personal computer in a wired or wireless communication manner to form a weighing communication topology network together. The digital load cells send formatted weighing data to the terminal devices such as the measuring instrument and the industrial personal computer for final processing and display.

Digital load cells have increasingly wider applications in the field of weighing systems, and the digitalization, intelligentization and networking of sensor nodes bring about more convenience for clients. With the enhancement of digital load cell functions, the increase of variety of client requirements, and the increase of weighing system processes and working conditions, the working mode of the existing digital load cell and the weighing system network formed thereby is single and cannot adapt to intelligent switching among various configuration modes.

SUMMARY

The technical problem solved by the present invention is to provide an intelligent digital load cell network based on multi-configuration techniques.

In order to solve the above technical problem, the technical solution used by the present invention is to propose a digital load cell, comprising: a force measurement element which detects a load stress of the cell and converts same into an electrical signal; a power incentive module which is connected to the force measurement element and provides an incentive voltage for the force measurement element; a signal detection module which is connected to the force measurement element and converts the electrical signal into a first digital signal, the signal detection module being configured by first configuration control information to use a corresponding detection mode to perform the conversion; a microprocessor which is connected to the signal detection module to receive the first digital signal, the processor being configured by second configuration control information to use one or more corresponding kernels or processors for running; a communication module which is connected to the microprocessor, the communication module being configured by third configuration control information to use a corresponding communication protocol, terminal matching and impedance control for communication; a current control module which configures, according to fourth configuration control information, the on/off, voltage values and current values of the power incentive module, the signal detection module, the microprocessor and the communication module; and a configuration control module which is connected to the signal detection module, the microprocessor, the communication module and the current control module and sends the first to fourth configuration control information according to a selected working mode.

In one embodiment of the present invention, the digital load cell further comprises a diagnosis module which is connected to the force measurement element and converts the electrical signal into a second digital signal reflecting cell state information, and transmits the second digital signal to the microprocessor, wherein the configuration control module further configures the signal detection module and the diagnosis module according to a weighing mode or a diagnosis mode.

In one embodiment of the present invention, the detection modes of the signal detection module comprise a high precision detection mode, a high response detection mode and an anti-interference detection mode.

In one embodiment of the present invention, the current control module is able to configure, control and detect in real time, according to the fourth configuration control information, the on/off, voltage values and current values of the power incentive module, the signal detection module, the microprocessor and the communication module.

In one embodiment of the present invention, the digital load cell further comprises a preset function control module which is connected to the configuration control module, and is configured by fifth configuration control information to enable the cell to work in a preset function mode.

In one embodiment of the present invention, the configuration control module configures the communication module in a communication configuration mode and a communication addressing mode.

In one embodiment of the present invention, the signal detection module comprises a high precision detection module, a high response detection module and an anti-interference detection module for respectively working in corresponding detection modes.

Further proposed in the present invention is a digital load cell network, comprising a plurality of digital load cells as mentioned above.

Since the above technical solution is used in the present invention, in combination with intelligent control techniques and control logic, multi-configuration technical design and real-time configuration of working mode are performed, so that the digital load cell can implement specific function applications and control processes. In addition, when the digital load cells form a network, a specific networking form can also be selected. Therefore, in comparison with traditional digital load cells, the present invention has more flexible and various working modes.

BRIEF DESCRIPTION OF THE DRAWINGS

The characteristic and performance of the present invention will be further described by the following embodiments in conjunction with the drawings, in which.

PREFERRED EMBODIMENTS

Figure 1:
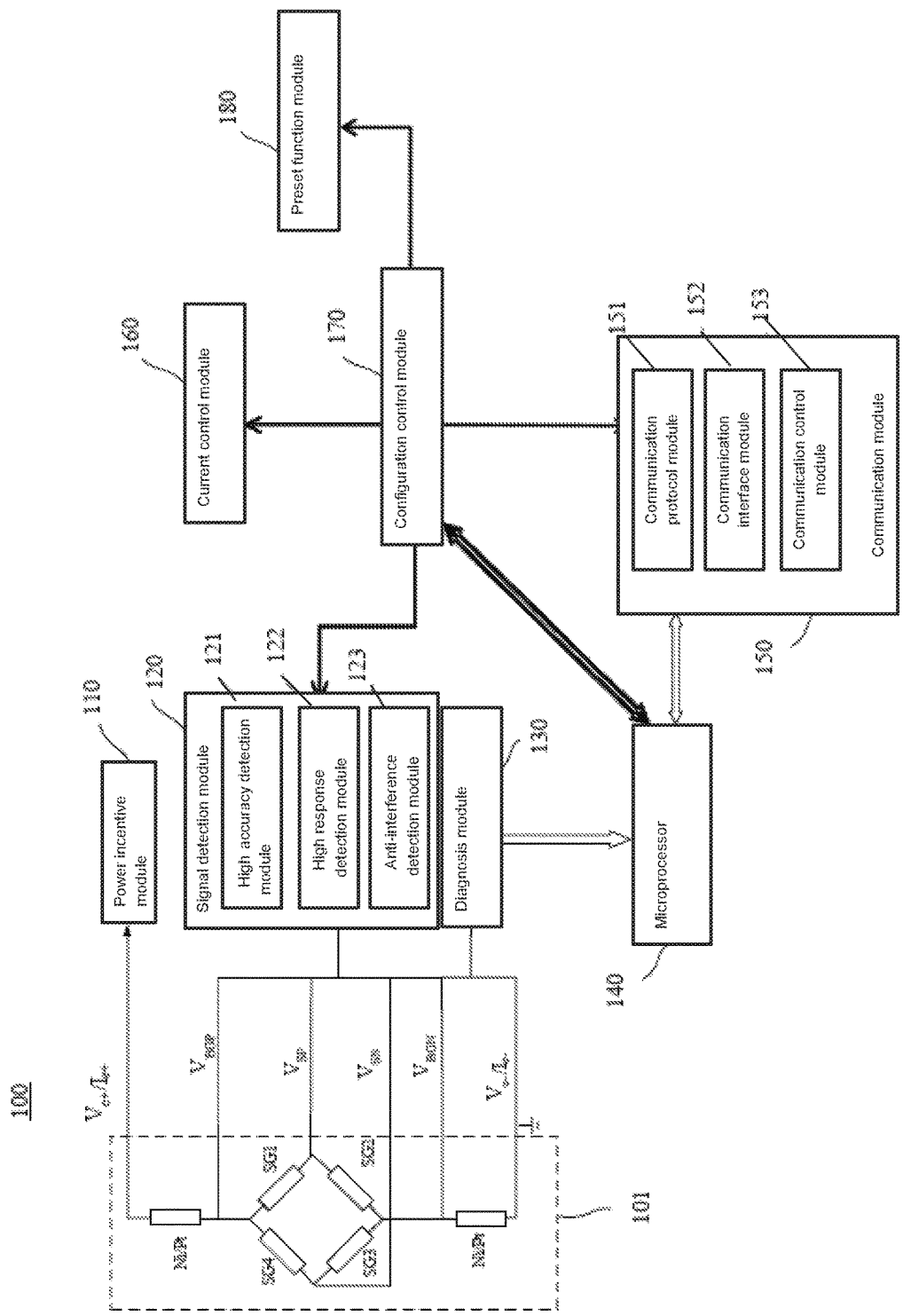
FIG. 1 shows a circuit block diagram of a multi-configuration digital load cell of one embodiment of the present invention.

FIG. 1 shows a circuit block diagram of a multi-configuration digital load cell of one embodiment of the present invention. Referring to FIG. 1, the digital load cell 100 comprises a force measurement element 101, a power incentive module 110, a signal detection module 120, a diagnosis module 130, a microprocessor 140, a communication module 150, a current control module 160, a configuration control module 170 and a preset function module 180.

The force measurement element 101 can detect the load stress of the cell and convert same into an electrical signal. The power incentive module 110 is connected to the force measurement element 101 and is used for providing an incentive voltage for the force measurement element. A typical example of the force measurement element 101 is a resistive strain gauge. The resistive strain gauge is connected to a temperature sensing element Ni/Pt resistor according to the Wheatstone bridge principle, and converts a load stress into electrical signals $V_{BGP}$, $V_{BGN}$, $V_{SP}$ and $V_{SN}$ under the action of incentive voltages $V_{e+}/I_{e+}$ and $V_{e-}/I_{e-}$ of the power incentive module 110.

The signal detection module 120 is connected to the force measurement element 101 and converts the various electrical signals into first digital signals. For example, the electrical signals $V_{BGP}$, $V_{BGN}$, $V_{SP}$ and $V_{SN}$ may be converted into corresponding digital signals. The signal detection module 120 can have different detection modes to perform the aforementioned conversion, such as a high precision detection mode, a high response detection mode and an anti-interference detection mode. The signal detection module 120 can be configured by first configuration control information from the configuration control module 160 to load a required detection mode. In this embodiment, the signal detection module 120 is implemented as comprising a high precision detection module 121, a high response detection module 122 and an anti-interference detection module 123 for respectively working in corresponding detection modes. The signal detection module 120 can switch these modules under the configuration of the first configuration control information. In another embodiment, the signal detection module 120 can run these three detection modes by means of integrated modules.

The diagnosis module 130 is connected to the force measurement element 101 and converts the electrical signals into second digital signals which reflect cell state information. For example, the electrical signals $V_{BGP}$, $V_{BGN}$, $V_{SP}$ and $V_{SN}$ are converted into digital signals which reflect cell state information by means of the diagnosis module 130.

The signal detection module 120 and the diagnosis module 130 are generally working alternatively, and this can be configured in different working modes of the cell such as a weighing mode or a diagnosis mode. It can be understood that the diagnosis module 130 is not necessary, and the designer can add or omit this module and the corresponding working mode according to functional requirements.

The microprocessor 140 is connected to the signal detection module 120 to receive the aforementioned first digital signals. The microprocessor 140 is also connected to the signal detection module 120 (if any) to receive the aforementioned second digital signals. The microprocessor 140 may contain a single core, multiple cores, a single processor or multiple processors. A program required for implementing intelligent measurement is running on the microprocessor 140. For example, the microprocessor 140 may control the working of the cell 100, and further process the collected digital signals. Data and instructions can be exchanged and interacted with the microprocessor 140 via interfaces conveniently. According to the working mode of the cell 100, the working of the microprocessor 130 can also be correspondingly configured. For example, the microprocessor 130 can be configured by second configuration control information to use one or more corresponding kernels or processors for running.

The communication module 150 is connected to the microprocessor 140. The communication module 150 accomplishes external data and instruction interaction of the cell 100. The communication module 150 can further comprise a communication protocol module 151, a communication interface module 152 and a communication control module 153. The communication protocol module 151 is responsible for parsing various data and interacted instructions of the cell 100 according to various wired or wireless communication protocols of RS232, RS485, RS422, CAN and Ethernet. The communication interface module 152 is responsible for receiving and sending the processed various data and interacted instructions according to interface drive methods required by respective communication protocols. The communication control module 153 is responsible for performing configuration and real-time control on the communication protocol module 151 and the communication interface module 152 according to requirements, and accomplishing specific requirements of terminal matching, signal matching and impedance control required by different communication protocols. The communication module 150 can be configured by third configuration control information to use a corresponding communication protocol, terminal matching and impedance control for communication.

The current control module 160 is responsible for performing configuration and real-time control and detection on the on/off, voltage values and current values of various function circuits 120, 130, 140 and 150 inside the cell 100 and the power incentive module 110. The current control module 160 can perform the configuration according to fourth configuration control information.

The configuration control module 170 is connected to the signal detection module 120, the diagnosis module 130, the microprocessor 140, the communication module 150 and the current control module 160, and sends the aforementioned first to fourth configuration control information according to a selected working mode.

Specifically, by controlling the current control module 160, the configuration control module 170 implements configuration and real-time control of the voltage and current of the power incentive module 110, thereby acquiring different electrical signals $V_{BGP}$, $V_{BGN}$, $V_{SP}$ and $V_{SN}$ with different incentive configurations to perform configuration and real-time control on the on/off, voltages and currents of various function circuits, so as to implement a control logic satisfying a particular time sequence. The configuration control module 170 performs configuration and real-time control on the signal detection module 120, so that the load cell 100 can accomplish different types of detection modes and achieve different detection purposes. The configuration control module 170 can configure the signal detection module 120 and the diagnosis module 130, so that the load cell 100 is working respectively in the weighing mode and the diagnosis mode. The configuration control module 170 can perform configuration and real-time control on the microprocessor 140, so that the load cell 100 can be working in different kernels and implement complicated functions. The configuration control module 170 can perform configuration and real-time control on the communication module 150, so that the load cell 100 can be working in different communication protocols and implement terminal matching and impedance control of communication signals.

In addition, the configuration control module 170 is also able to implement configuration and real-time control on the preset function module 180 so as to implement preset functions.

The implementation of the configuration control module 170 may be a logical control device combined by a variety of controlled switches, and may also be a logical control device such as a CPLD or FPGA, and may also be implemented via software. In summary, these logical control devices perform a variety of configurations on the digital load cell according to requirements of a control process and application scenario and based on a certain time sequence and control logic. Specifically, configuring the internal running mode of the digital load cell enables the weighing system to be running in different working modes, such as a communication configuration mode, a communication addressing mode, a weighing mode, a detecting and diagnosing mode, a system maintenance mode and various other modes. For another example, configuring the running methods and parameters of various function modules of the digital load cell implements a variety of configuration control such as the voltage of various power sources, the on/off of various currents, the change of the impedance value between lines, the selection of the configuration of the signal detection circuit, the on/off of a specific function circuit and the on/off of a diagnosis function circuit. Configuring the communication form of the digital load cell implements real-time configuration on a variety of wired or wireless communication network modes and corresponding communication interfaces such as RS232, RS485, RS422, CAN and Ethernet of the weighing system. Configuring the network connection mode of the digital load cell can implement real-time configuration of the topological structure of the weighing system network.

In brief, the working process of the load cell is as follows: after the load cell 100 is loaded, the force measurement element 101 is in cooperation with the power incentive module 110 to generate an analog signal corresponding to the load; the signal detection module 120 converts this analog signal into a digital signal; and the microprocessor 140 internally integrated in the load cell 100 processes this digital signal, converts same into digital information which reflects the load stress, and sends same to a terminal device such as a weighing terminal, an industrial personal computer or a programmable logic controller (PLC) via a certain network protocol and interface method, thus accomplishing the collection and processing of weighing information.

The load cells can be in a mutual communication connection to form a cell network, and in a communication connection with a weighing terminal to form a weighing system. The structure of the configuration weighing terminal is firstly introduced below.

Figure 2:
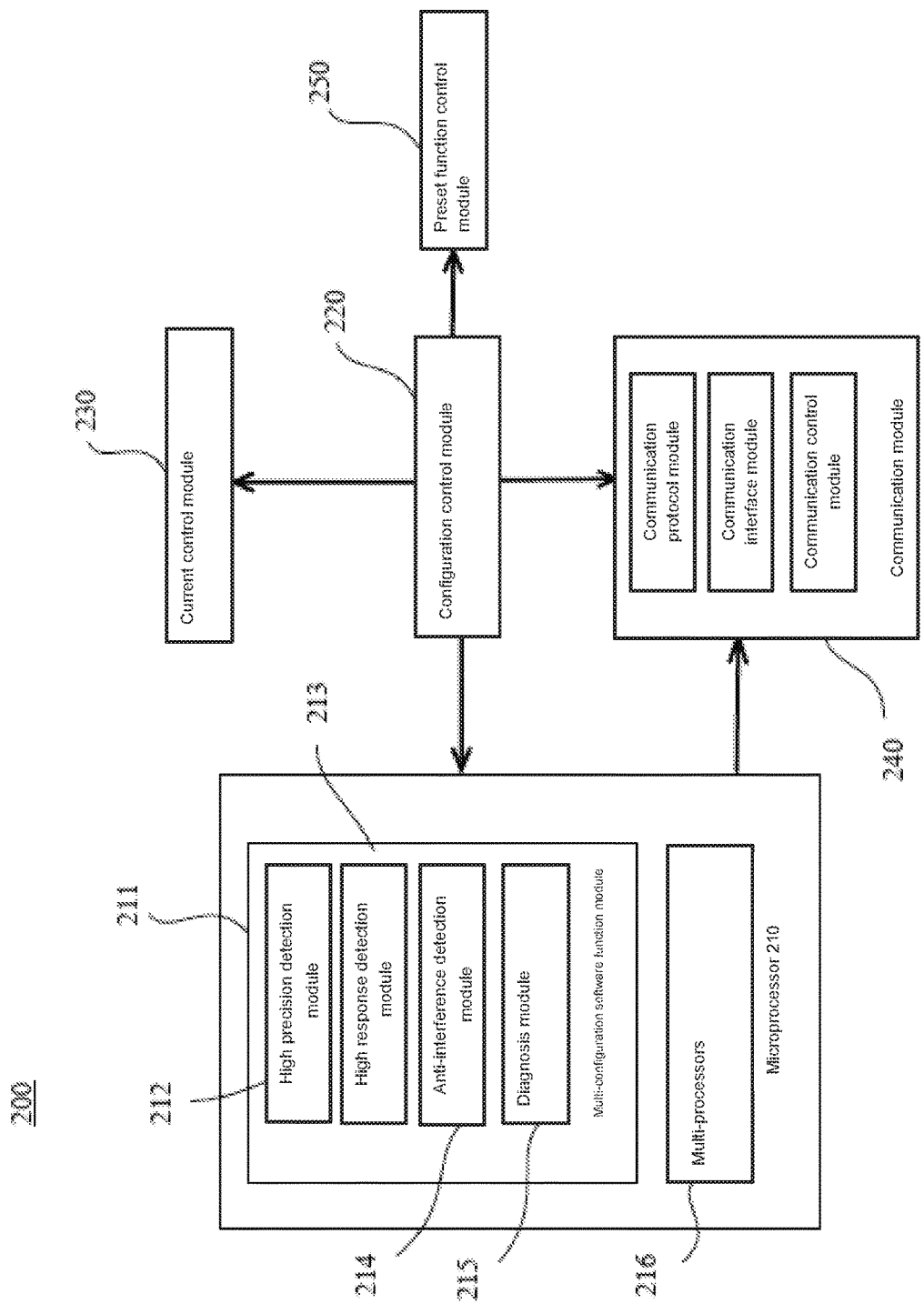
FIG. 2 shows a circuit block diagram of a multi-configuration weighing terminal of one embodiment of the present invention.

FIG. 2 shows a circuit block diagram of a multi-configuration weighing terminal of one embodiment of the present invention. Referring to FIG. 2, the weighing terminal 200 comprises a microprocessor 210, a configuration control module 220, a current control module 230, a communication module 240 and a preset function module 250. The microprocessor 210 comprises a multi-configuration software function module 211 and multi-processors 216. The multi-configuration software function module 211 may further comprise a high precision detection module 212, a high response detection module 213, an anti-interference detection module 214 and a diagnosis module 215. The multi-configuration software function module 211 is in cooperation with various modules of the digital load cell 100, and implements the switching among software functions and various functions of the weighing system together, such as a variety of functions of high precision detection, high response detection, anti-interference detection and diagnosis. The multi-processors module 216 can enable, according to requirements, the software function module to be running on a variety of processor platforms such as a single core, multiple cores, a single processor or multi-processors.

The communication module 240 comprises a communication protocol module 241, a communication interface module 242 and a communication control module 243 together. The communication protocol module 241 is responsible for parsing various data and interacted instructions of the cell 100 according to various wired or wireless communication protocols of RS232, RS485, RS422, CAN and Ethernet. The communication interface module 242 is responsible for receiving and sending the processed various data and interacted instructions according to interface drive methods required by respective communication protocols. The communication control module 243 is responsible for performing configuration and real-time control on the communication protocol module and the communication interface module according to requirements, and accomplishing specific requirements of terminal matching, signal matching and impedance control required by different communication protocols.

The current control module 230 is responsible for performing configuration, real-time control and detection on the on/off, voltage values and current values of internal function modules of the weighing terminal 200 and the weighing cell network.

The configuration control module 220 performs configuration, real-time control and detection on the on/off, voltage values and current values of internal function modules of the weighing terminal and the weighing cell network, so as to implement a control logic satisfying a particular time sequence. The configuration control module 220 can perform configuration and real-time control on the multi-processors module 216, so that the weighing terminal 200 can be working in different kernels and implement complicated functions. The configuration control module 220 can perform configuration and real-time control on the communication module 240, so that the weighing terminal 200 can be working in different communication protocols and implement terminal matching and impedance control of communication signals. The configuration control module 220 is able to implement configuration and real-time control on other preset function module 250 so as to implement preset functions.

The implementation of the configuration control module 220 may be a logical control device combined by a variety of controlled switches, and may also be a logical control device such as a CPLD or FPGA, and may also be implemented via software.

Figure 3:
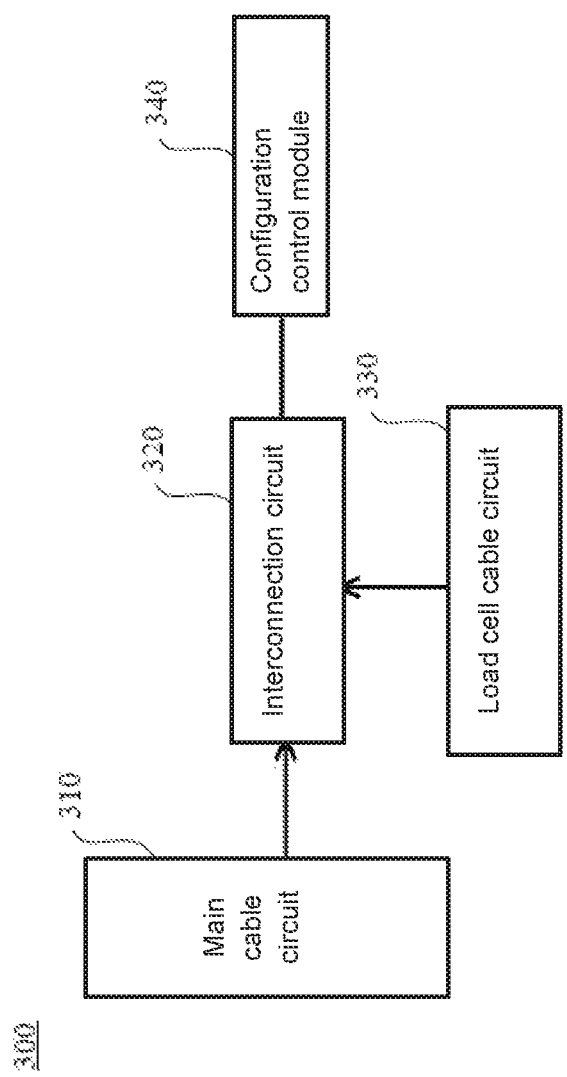
FIG. 3 shows a schematic diagram of a multi-configuration communication connection apparatus of one embodiment of the present invention.

FIG. 3 shows a schematic diagram of a multi-configuration communication connection apparatus of one embodiment of the present invention. The communication connection apparatus 300 is used for connecting various cells 100 and the weighing terminal 200 to form a weighing system. The multi-configuration communication connection apparatus 300 is implemented by means of connection assemblies such as a junction box, a multi-function communication cable and a communication interface board. Referring to FIG. 3, the communication connection apparatus 300 comprises a main cable circuit 310, an interconnection circuit 320, a load cell cable circuit 330 and a configuration control module 340. The load cell cable circuit 330 is responsible for accomplishing the electrical connection between a load cell cable and the communication connection apparatus 300. The main cable circuit 310 is responsible for accomplishing the electrical connections among cables in the communication connection apparatus 300, cables between the cell 100 and the weighing terminal 200 and cables between the communication connection apparatus 300 and the weighing terminal 200, besides the load cell cables. The interconnection circuit 320 is responsible for performing electrical connection between a load cell cable signal and a main cable signal. The configuration control module 340 can control the interconnection circuit 320 according to requirements, thereby implementing the interconnection of the load cell network in different network topology forms, such as bus-based, daisy-chained, star-shaped and complicated cascading forms.

Figure 4:
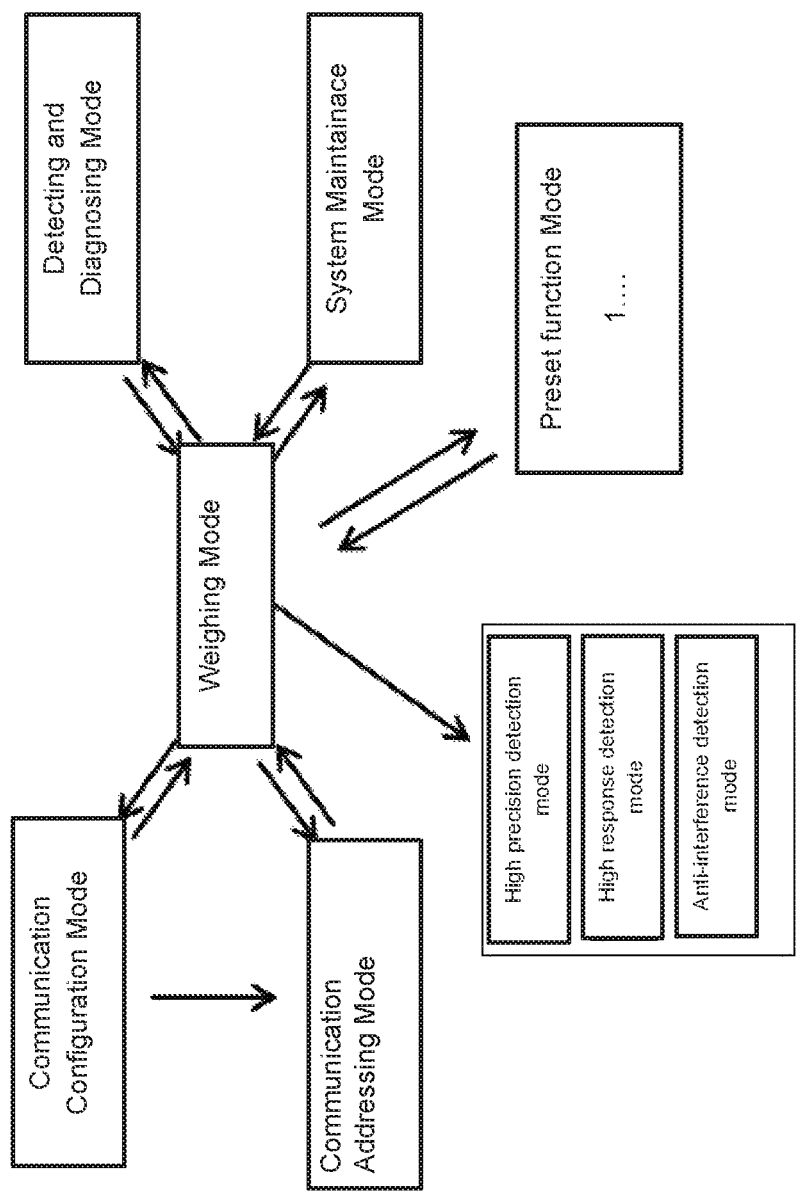
FIG. 4 shows a function mode switching diagram of a multi-configuration weighing system of one embodiment of the present invention.

FIG. 4 shows weighing system function modes based on multi-configuration techniques. Referring to FIG. 4, the weighing system software will be respectively running on terminal devices of a digital load cell and a weighing terminal, etc., and will be cooperated to implement multi-configuration configurable functions. In a weighing system configuration phase, the software system may be successively working in a communication configuration mode and a communication addressing mode; after the system configuration phase is completed, the system will be running in a weighing mode, and at this moment, the software system may be respectively running in a high precision detection mode, a high response detection mode and an anti-interference detection mode according to actual application requirements and client needs; the system software can be switched to a detecting and diagnosing mode, a system maintenance mode or various other preset function modes according to actual requirements, and can be switched back to the normal weighing mode after accomplishing the corresponding function; and in the meantime, the system software can take the weighing mode as a core to freely switch among a variety of configuration modes.

Figure 5:
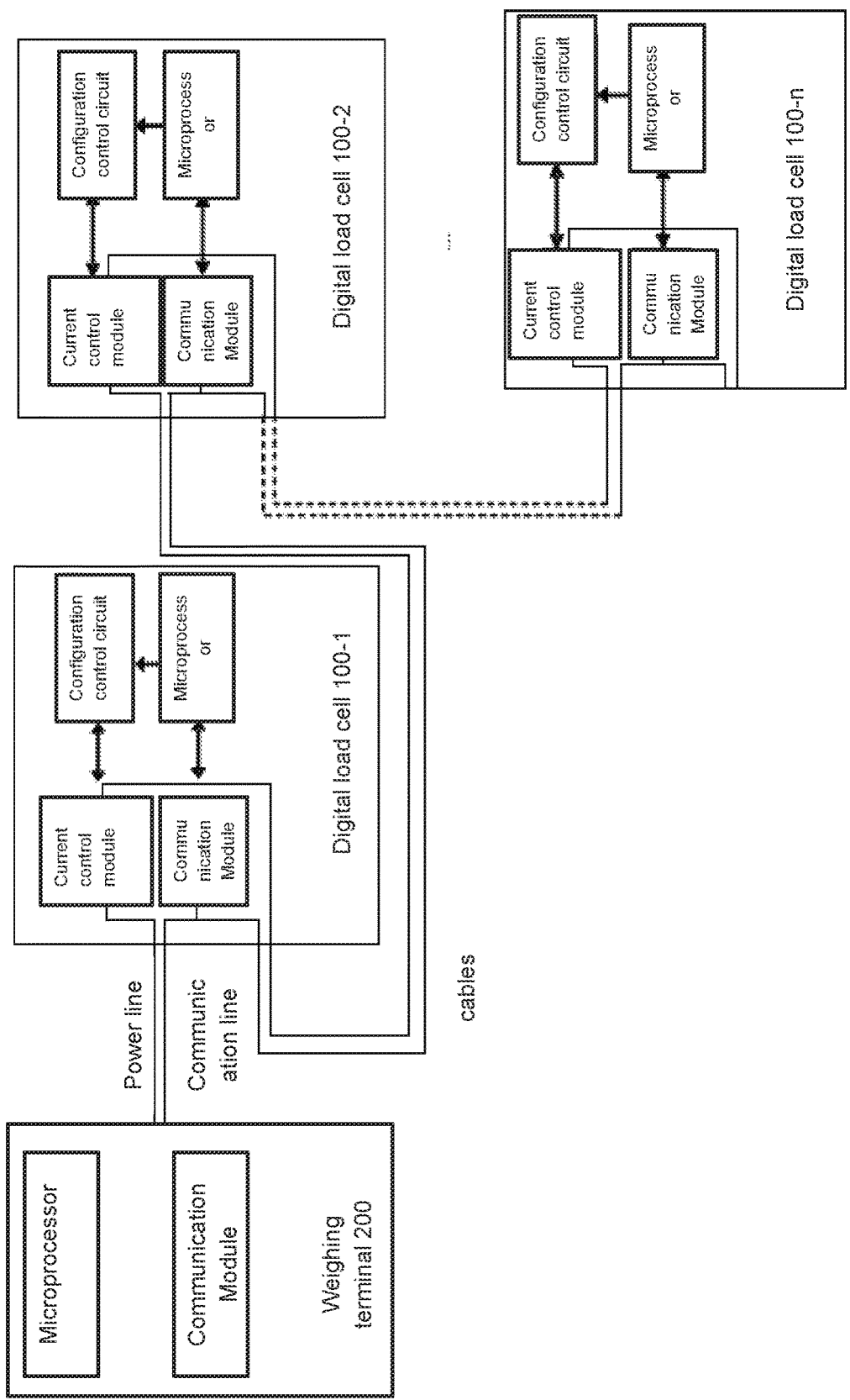
FIG. 5 shows a network topology graph of a multi-configuration digital load cell of one embodiment of the present invention.

FIG. 5 shows a network topology graph of a multi-configuration digital load cell of one embodiment of the present invention. Referring to FIG. 5, the network topology comprises digital load cells 100-1, 100-2, . . . , 100-*n*, and a weighing terminal 200, and they are connected with cables. The addressing process is as follows:

1. when the digital load cells 100-1, 100-2, . . . , 100-*n* are connected into a cell network in a certain physical position sequence and in a certain topology form, the weighing terminal 200 needs to addressing various sensors in the network in the communication configuration mode and the communication addressing mode. However, in a conventional method, the correspondence between network addressing serial numbers of cells and the physical position sequence cannot be implemented automatically. The digital load sensor network serialization addressing technique based on multi-configuration techniques can correspond the network addresses to the physical sequence.

2. The weighing terminal 200 connects the digital load cells 1, 2, . . . , n into a network via cables according to a certain network topology principle, wherein the identification codes 1, 2, . . . , n of the digital load cells correspond to the position serial codes thereof, and the communication cables contain a power signal line and a communication signal line.

3. After entering the digital load cell 100-1, the communication signal line accesses the communication module to receive and send communication signals, parse a communication protocol, match communication signals and control impedance; and the power signal line accesses the current control module to supply external power to the digital load cell 100-1, and supplies power to the subsequent cell network under the control of the current control module. The initial configuration of the digital load cells 1, 2, . . . , n enables the current control module to disable the power supply to the subsequent cell network.

4. When the weighing system enters the communication configuration and communication addressing modes, because of the configuration of the current control module in the digital load cell 100-1, the weighing terminal 200 may only be in communication with the digital load cell 100-1. The weighing terminal 200 configures the digital load cell 100-1 into a network address 1 via a communication configuration and addressing function, thereby corresponding to the physical address thereof; after the addressing is implemented, the digital load cell 100-1 configures the current control circuit via the configuration control module to enable the power supply to the subsequent cell network; and the communication module is configured to ensure communication signal matching and impedance control.

5. After operation 4 is accomplished, the digital load cell 100-2 obtains power supply. The weighing terminal 200 configures the digital load cell 100-2 into a network address 2 via a communication configuration and addressing function. After the addressing is implemented, the digital load cell 100-2 configures the current control module via the configuration control module to enable the power supply to the subsequent cell network; and the communication module is configured to ensure communication signal matching and impedance control.

6. According to basic principles of aforementioned operations 4 and 5, network addresses of all the load cells in the network are accomplished gradually, and the correspondence between the network addresses thereof and the addressing sequence and communication signal matching and impedance control in the network are implemented. In the meantime, the digital load cells 1, 2, . . . , n record the configuration states of the current control module in a non-volatile memory.

7. After the communication configuration and addressing of the weighing system are accomplished, the weighing mode is entered for working.

8. Integrating various current control modules in a multi-function communication cable to receive the configuration and real-time control of various configuration control modules can likewise implement similar functions of operations 1-6.

Figure 6:
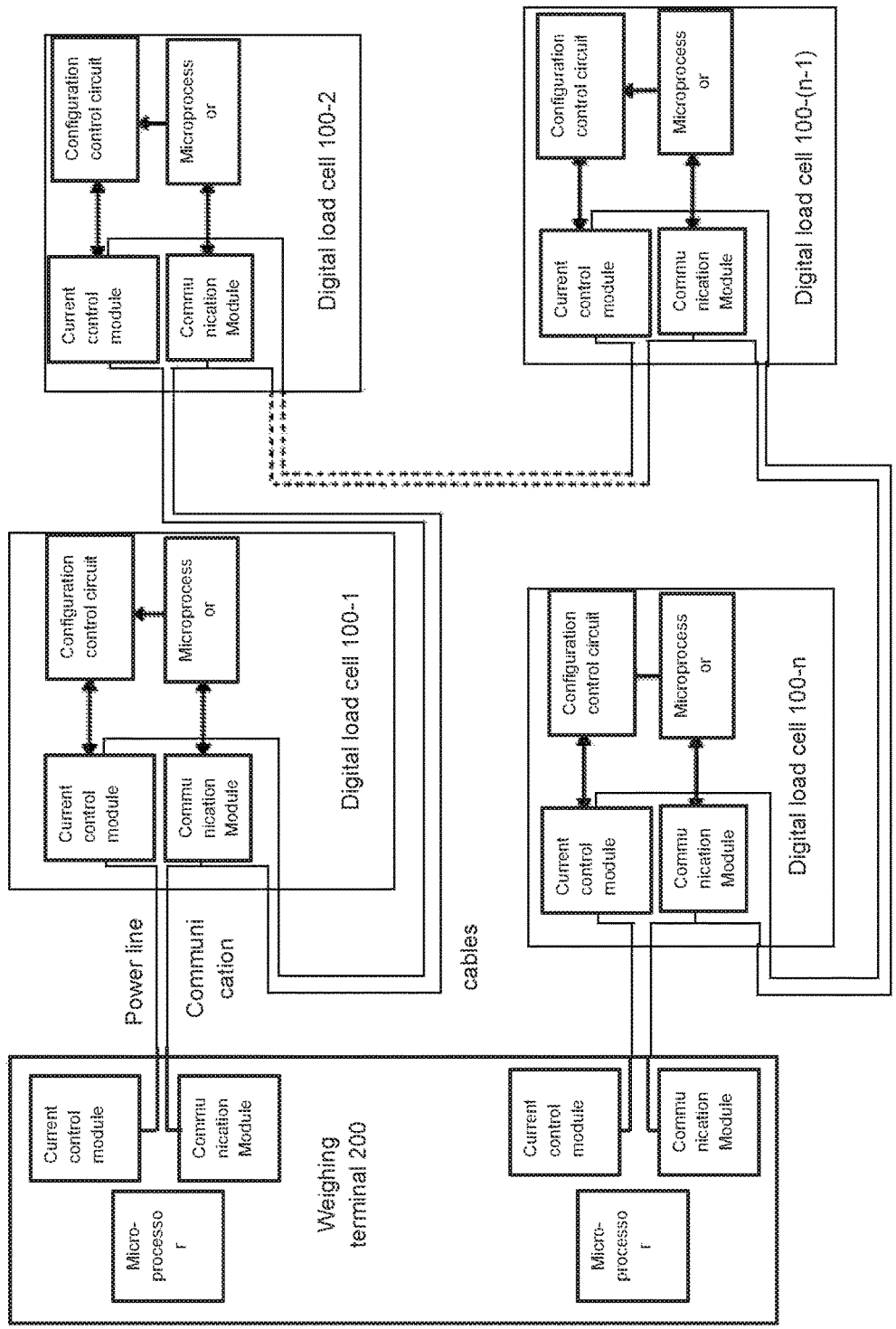
FIG. 6 shows a network topology graph of a multi-configuration digital load cell of another embodiment of the present invention.

FIG. 6 shows a network topology graph of a multi-configuration digital load cell of another embodiment of the present invention. Referring to FIG. 6, the network topology in this embodiment comprises digital load cells 100-1, 100-2, . . . , 100-(n−1), 100-n, and a weighing terminal 200, and they are connected with cables.

After the digital load cells form a topology network, since the conventional network structure is of a single-line connection form, if cable breakdown or a joint failure occurs, some digital load cells of which the functions work normally cannot be working. The digital load cell ring topology method based on multi-configuration techniques and safe redundancy design in this embodiment can enable the weighing system to be still working when cable breakdown or a joint failure occurs. The implementation process is as follows:

1. after the digital load cells 100-1, 100-2, . . . , 100-(n−1), 100-n and the weighing terminal 200 accomplish a conventional network connection, then a cable is used to connect the digital load cell 100-n at the tail end of the network to the weighing terminal 200, thereby implementing a ring topology structure on the basis of a conventional network connection.

2. When the weighing system is running in the weighing mode, the microprocessor, current control module and communication module in the weighing terminal 200 is working normally, the microprocessor and the current control module are in a standby state, and the communication module achieves communication signal matching and impedance control.

3. When cable breakdown or a joint failure occurs to the weighing system, for example, the cable before the digital load cell 100-(n−1) breaks down, some load cells cannot be in communication with the weighing terminal. The weighing terminal switches to the detecting and diagnosing mode and is in cooperation with the current control module to determine that a cable breakdown phenomenon occurs to the system, and determine the position where cable breakdown occurs.

4. The weighing terminal 200 configures the microprocessor and the current control module which are originally in a standby state into a normal working state via the configuration control module. The current control module supplies power to the digital load cells 100-(n−1), 100-n, etc.; and the microprocessor implements communication configuration and data and instruction interaction with the digital load cells 100-(n−1), 100-n, etc. via the communication module.

5. The digital load cell near the cable breakdown implements communication signal matching and impedance control via the communication module to ensure the reliability of communication.

6. After operations 4 and 5, the ring network of the digital load cells has actually divided into two sub-networks, and each sub-network can implement a corresponding weighing function via the corresponding circuit module of the weighing terminal 200 and digital load cells. The microprocessor of the weighing terminal 200 can summarize the data and instructions of the two, so that the weighing system can still be working normally.

In the above embodiments of the present invention, software and hardware resources integrated inside terminal devices such as a digital load cell, a communication connection apparatus and a weighing terminal are utilized, in combination with intelligent control techniques and control logic, multi-configuration technical design and real-time configuration of working mode of the weighing system are performed, so that specific function applications, control processes and network forms can be implemented. In addition, after a specific function is accomplished, the weighing network can also be working in a conventional state again via configuration.

What is claimed is:

1. A digital load cell, comprising:
   a force measurement element, arranged to detect a load stress of the cell and convert the load stress into an electrical signal;
   a power incentive module, connected to the force measurement element to provide an incentive voltage for the force measurement element;
   a signal detection module, connected to the force measurement element to receive the electrical signal therefrom and to convert the received electrical signal into a first digital signal;
   a microprocessor, connected to the signal detection module to receive the first digital signal;
   a communication module, connected to the microprocessor;
   a current control module, arranged to provide voltages and currents to the power incentive module, the signal detection module, the microprocessor and the communication module; and
   a configuration control module, which, according to a working mode selected by a user, is connected to:
      the signal detection module, to provide first configuration control information to use a corresponding detection mode for converting the electrical signal;
      the microprocessor, to provide second configuration control information to use one or more corresponding kernels or processors to operate;
      the communication module, to provide third configuration control information to use a corresponding communication protocol, terminal matching and impedance control for communication; and
      the current control module, to provide fourth configuration control information to use to determine the voltage and current provided.

2. The digital load cell according to claim 1, further comprising:
   a diagnosis module, connected to the force measurement element to receive the electrical signal, to convert the electrical signal into a second digital signal that reflects cell state information, and to transmit the second digital signal to the microprocessor, wherein the configuration control module further configures the signal detection module and the diagnosis module according to a weighing mode or a diagnosis mode.

3. The digital load cell according to claim 1, wherein the detection modes of the signal detection module comprise:
   a high precision detection mode;
   a high response detection mode; and
   an anti-interference detection mode.

4. The digital load cell according to claim 3, wherein the signal detection module comprises a high precision detection module, a high response detection module and an anti-interference detection module, for respectively working in the corresponding detection modes.

5. The digital load cell according to claim 1, further comprising:

a preset function control module, connected to the configuration control module to receive fifth configuration control information to enable the cell to work in a preset function mode.

6. The digital load cell according to claim 1, wherein, the current control module, using the fourth configuration control information, configures, controls and detects in real time, voltage values and current values of the power incentive module, the signal detection module, the microprocessor and the communication module.

7. The digital load cell according to claim 1, wherein the configuration control module configures the communication module in a communication configuration mode and a communication addressing mode.

8. A digital load cell network, comprising:
a weighing terminal; and
a plurality of digital load cells in communication with each other and with the weighing terminal, wherein each of the digital load cells comprises
a force measurement element, arranged to detect a load stress of the cell and convert the load stress into an electrical signal;
a power incentive module, connected to the force measurement element to provide an incentive voltage for the force measurement element;
a signal detection module, connected to the force measurement element to receive the electrical signal therefrom and to convert the received electrical signal into a first digital signal;
a microprocessor, connected to the signal detection module to receive the first digital signal;
a communication module, connected to the microprocessor;
a current control module, arranged to provide voltages and currents to the power incentive module, the signal detection module, the microprocessor and the communication module; and
a configuration control module, which, according to a working mode selected by a user, is connected to:
the signal detection module, to provide first configuration control information to use a corresponding detection mode for converting the electrical signal;
the microprocessor, to provide second configuration control information to use one or more corresponding kernels or processors to operate;
the communication module, to provide third configuration control information to use a corresponding communication protocol, terminal matching and impedance control for communication; and
the current control module, to provide fourth configuration control information to use to determine the voltage and current provided.

9. The digital load cell network according to claim 8, wherein each of the digital load cells further comprises:
a diagnosis module, connected to the force measurement element to receive the electrical signal, to convert the electrical signal into a second digital signal that reflects cell state information, and to transmit the second digital signal to the microprocessor, wherein the configuration control module further configures the signal detection module and the diagnosis module according to a weighing mode or a diagnosis mode.

10. The digital load cell network according to claim 8, wherein the detection modes of the signal detection module comprise:
a high precision detection mode;
a high response detection mode; and
an anti-interference detection mode.

11. The digital load cell network according to claim 10, wherein the signal detection module comprises a high precision detection module, a high response detection module and an anti-interference detection module, for respectively working in the corresponding detection modes.

12. The digital load cell network according to claim 8, further comprising:
a preset function control module, connected to the configuration control module to receive fifth configuration control information to enable the cell to work in a preset function mode.

13. The digital load cell network according to claim 8, wherein, the current control module, using the fourth configuration control information, configures, controls and detects in real time, voltage values and current values of the power incentive module, the signal detection module, the microprocessor and the communication module.

14. The digital load cell according to claim 8, wherein the configuration control module configures the communication module in a communication configuration mode and a communication addressing mode.

* * * * *